(12) United States Patent
Cornell et al.

(10) Patent No.: US 7,961,382 B2
(45) Date of Patent: Jun. 14, 2011

(54) MID INFRARED SPECTRAL BAND CONTINUOUS ZOOM SYSTEM

(75) Inventors: Jim D Cornell, Rochester, NY (US); Mark C Sanson, Macedon, NY (US)

(73) Assignee: Corning Incorporated, Corning, NY (US)

( * ) Notice: Subject to any disclaimer, the term of this patent is extended or adjusted under 35 U.S.C. 154(b) by 97 days.

(21) Appl. No.: 12/549,423

(22) Filed: Aug. 28, 2009

(65) Prior Publication Data

US 2011/0052166 A1 Mar. 3, 2011

(51) Int. Cl.
*G02B 15/14* (2006.01)
*G02B 13/14* (2006.01)
*G02B 21/00* (2006.01)

(52) U.S. Cl. ........ 359/354; 359/356; 359/357; 359/380; 359/676

(58) Field of Classification Search ............... 250/316.1, 250/332, 334; 359/354, 356, 357, 380, 676
See application file for complete search history.

(56) References Cited

U.S. PATENT DOCUMENTS

| | | | |
|---|---|---|---|
| 4,632,498 A * | 12/1986 | Neil | 359/354 |
| 4,907,867 A | 3/1990 | Perrin et al. | |
| 5,022,724 A | 6/1991 | Shechterman | |
| 5,493,441 A * | 2/1996 | Chipper | 359/354 |
| 6,091,551 A | 7/2000 | Watanabe | |
| 7,012,759 B2 * | 3/2006 | Betensky et al. | 359/676 |
| 7,092,150 B1 * | 8/2006 | Cox | 359/356 |
| 7,224,535 B2 * | 5/2007 | Neil | 359/683 |
| 2005/0259330 A1 | 11/2005 | Neil | |

FOREIGN PATENT DOCUMENTS

GB 2138591 10/1984

OTHER PUBLICATIONS

M. Sanson and J. Cornell, "MWIR Continuous Zoom with Large Zoom Range", Proc. Of SPIE vol. 7660 (2010).*
A. Mann, "IR Zoom Lenses in the 1990s", Optical Engineering, vol. 33 No. 1, pp. 109-115 (1994).*
R.L. Sinclair; "Using Multiple Diffractive Optical Elements in Infrared Lens Design"; Proc. SPIE, vol. 3698; Apr. 1999; pp. 848-856.
R.L. Sinclair; "High Magnification Zoom Lenses for 3-5 μm Applications"; Proc. SPIE, vol. 3429; Jul. 1998; pp. 11-18.
M. Roberts; "High Aperture Zoom Optics, Employing Diffractive Surfaces, in the 3-5 Micron Infrared Waveband"; Proc. SPIE, vol. 3129, 1997, pp. 120-130.
R. Barry Johnson et al; "Compact Infrared Zoom Lens for the 3-5 μm Spectral Band"; Proc. SPIE vol. 2744; 1996; pp. 181-192.

* cited by examiner

*Primary Examiner* — David N Spector
(74) *Attorney, Agent, or Firm* — Timothy M Schaeberle (57) ABSTRACT

A mid infrared spectral band continuous zoom system is described herein that can provide a continuous zoom range with a focal length change greater than 25× when thermally imaging a distant object. In addition, a method is described herein for using the mid infrared spectral band continuous zoom system to thermally image the distant object.

23 Claims, 4 Drawing Sheets

MID INFRARED SPECTRAL BAND CONTINUOUS ZOOM SYSTEM

TECHNICAL FIELD

The present invention relates to a mid infrared spectral band continuous zoom system for thermally imaging a distant object. The mid infrared spectral band continuous zoom system has a continuous zoom range with a focal length change that is greater than 25×.

BACKGROUND

The traditional mid infrared spectral band systems utilize several discrete fields of view or several discontinuous zoom ranges to thermally image a distant object in the mid infrared spectral range (3-5 µm). As such, manufacturers have been trying to design and produce a mid infrared spectral band continuous zoom system with a continuous zoom over a large zoom range (e.g., greater than 25×) to thermally image a distant object in the mid infrared spectral range (3-5 µm). One such mid infrared spectral band continuous zoom system is the subject of the present invention.

SUMMARY

In one aspect, the present invention provides a mid infrared spectral band continuous zoom system for thermally imaging an object. The mid infrared spectral continuous zoom system includes: (a) a positive element that focuses incoming light from the object; (b) a negative focal length moving group that intercepts the light being focused by the positive element and creates a virtual image; (c) a positive focal length moving group that relays the virtual image created by the negative focal length moving group to an intermediate image; (d) a relay group that relays the intermediate image to a final image plane; and (e) a cooled infrared camera that thermally images the object at the final image plane. The negative focal length moving group and the positive focal length moving group are moved relative to one another while providing a continuous zoom range with a focal length change greater than 25×.

In another aspect, the present invention provides a method for thermally imaging an object in a mid infrared spectral range (3-5 µm). The method includes the steps of: (a) providing a mid infrared spectral band continuous zoom system including: (i) a positive element that focuses incoming light from the object; (ii) a negative focal length moving group that intercepts the light being focused by the positive element and creates a virtual image; (iii) a positive focal length moving group that relays the virtual image created by the negative focal length moving group to an intermediate image; (iv) a relay group that relays the intermediate image to a final image plane; and (v) a cooled infrared camera that thermally images the object at the final image plane; and (b) moving the negative focal length moving group and the positive focal length moving group relative to one another while providing a continuous zoom range with a focal length change that is greater than 25× when imaging the object.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be had by reference to the following detailed description when taken in conjunction with the accompanying drawings wherein.

DETAILED DESCRIPTION

Figure 1A:
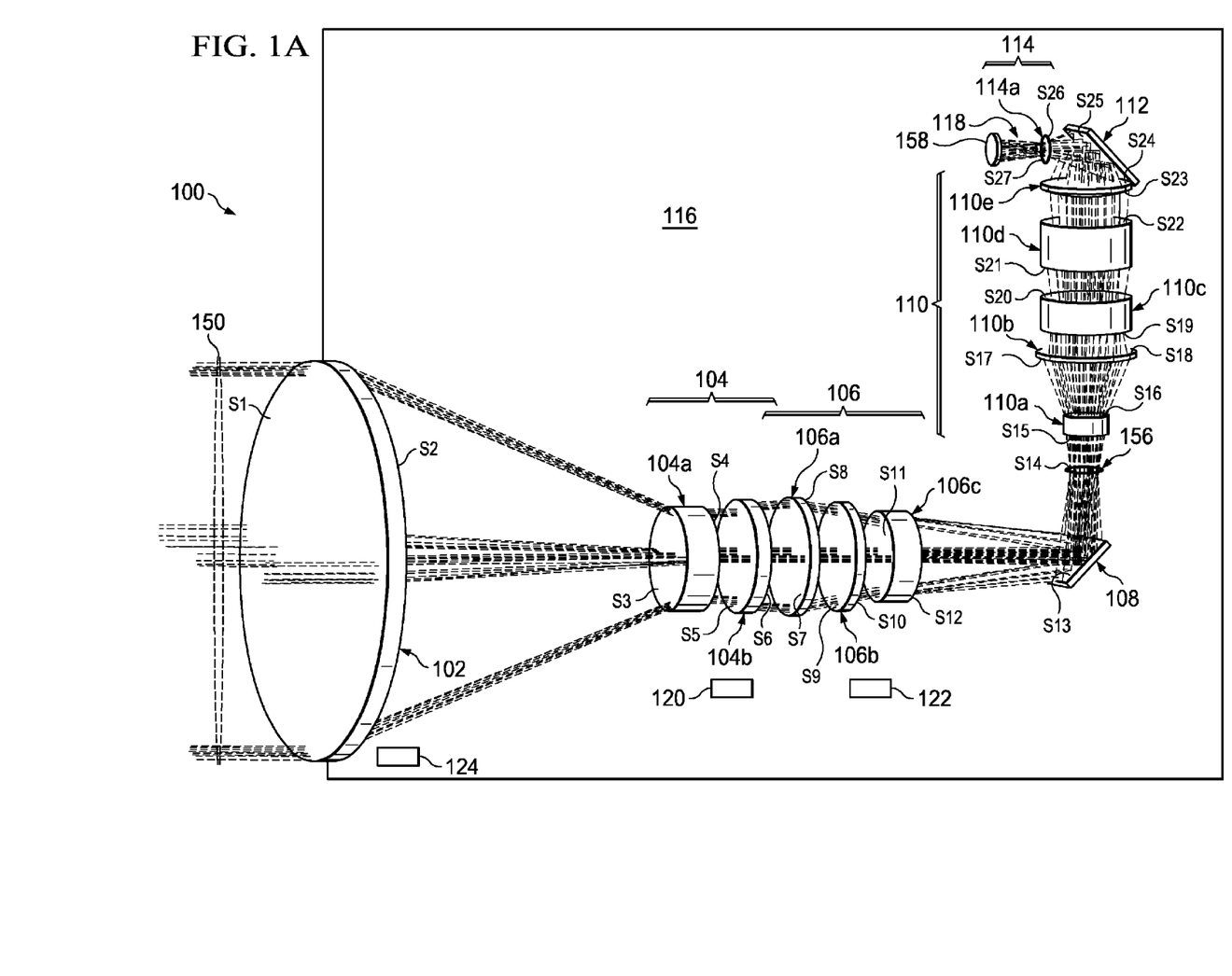
FIGS. 1A-1B illustrate an exemplary mid infrared spectral band continuous zoom system configured in accordance with a first embodiment of the present invention.
Figure 1B:
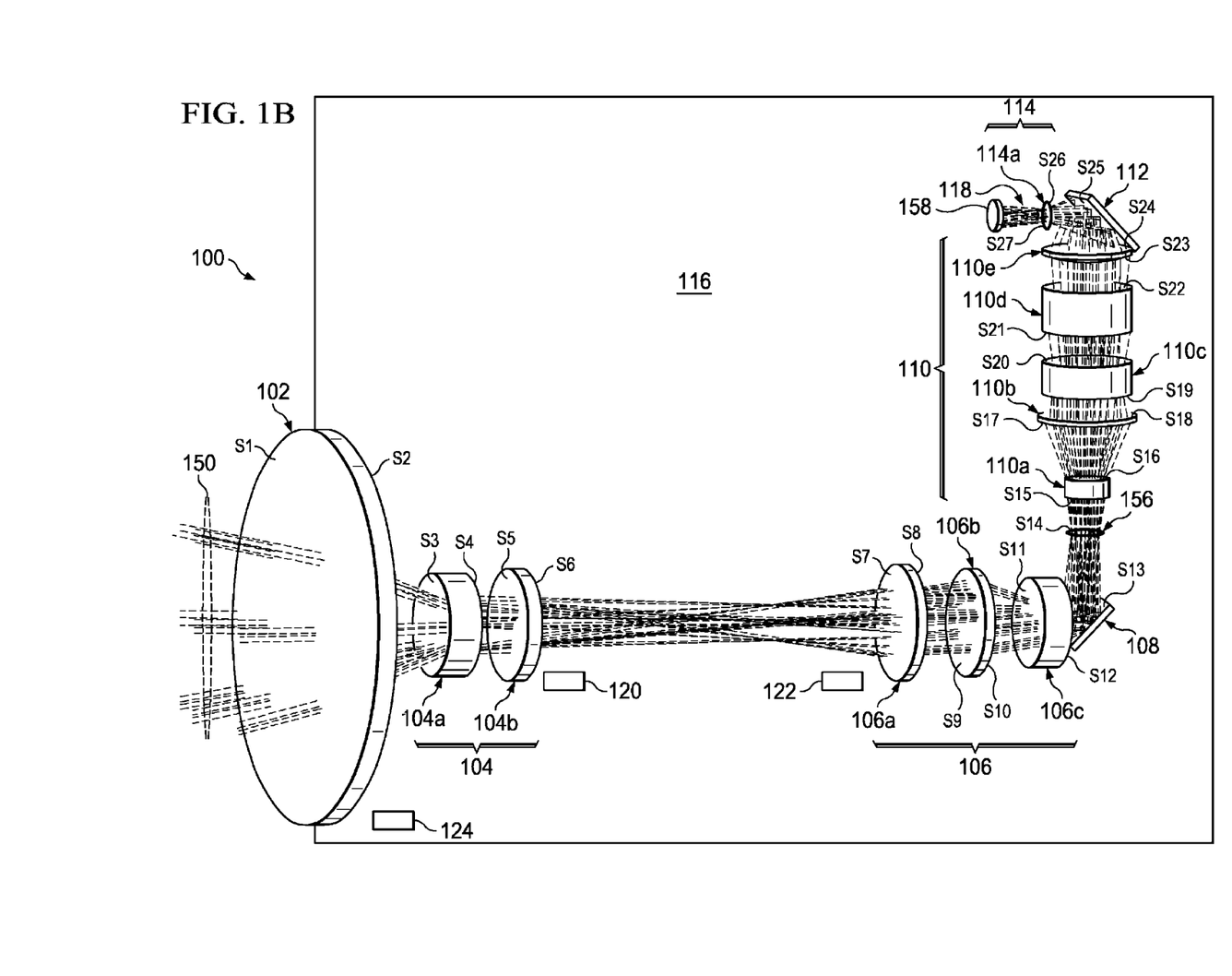

Referring to FIGS. 1A-1B, there are illustrated an exemplary mid infrared spectral band continuous zoom system 100 in accordance with a first embodiment of the present invention. The mid infrared spectral band continuous zoom system 100 includes a positive element 102, a negative focal length moving group 104, a positive focal length moving group 106, a first fold mirror 108 (optional), a relay group 110, a second fold mirror 112 (optional), and a cooled infrared camera 114. In addition, the mid infrared spectral band continuous zoom system 100 includes an enclosure 116 (e.g., gimbal enclosure 116, spotting scope enclosure 116) that protects at least the positive element 102, the negative focal length moving group 104, the positive focal length moving group 106, the first fold mirror 108, the relay group 110, the second fold mirror 112, and the cooled infrared camera 114.

The mid infrared spectral band continuous zoom system 100 has a continuous zoom with a 25× or greater magnification range and a fixed focal plane array that can thermally image an object (not shown) in the 3-5 µm spectral band. In operation, the positive element 102 is positioned to receive and focus incoming light 150 (collimated light 150) from the object. The negative focal length moving group 104 intercepts the light 150 being focused by the positive element 102 and creates a virtual image (which is located to the left of the negative length moving group 104). The positive focal length moving group 106 relays the virtual image via the first fold mirror 108 to an intermediate image 156 (real image location 156). The relay group 110 relays the intermediate image 156 via the second fold mirror 112 to a final image plane 158. The relay group 110 also functions to reduce the diameter of the front positive element 102. The cooled infrared camera 114 (with a fixed diameter cold aperture stop 118) thermally images the object at the final image plane 158. The negative focal length moving group 104 and the positive focal length moving group 106 are axially moved relative to one another to provide a continuous zoom range with a focal length change greater than 25× (see FIGS. 1A and 1B). Linear actuators 120 and 122 can be used to move the negative focal length moving group 104 and the positive focal length moving group 106. The components 102, 104, 106, 108, 110, 112, and 114 can be located in cells.

In this configuration, the size of the intermediate image 156 remains fixed while the field of view (FOV) of the incoming light 150 changes based on the magnifications of the negative focal length moving group 104 and the positive focal length moving group 106. For instance, the negative focal length moving group 104 and the positive focal length moving group 106 can be moved close to one another to enable a narrow field of view (NFOV) of the incoming light 150 to about 1.25° (see FIG. 1A). In contrast, the negative focal length moving group 104 and the positive focal length moving group 106 are moved apart from one another to enable a wide field of view (WFOV) of the incoming light 150 to over 38° (see FIG. 1B). Thus, the mid infrared spectral band continuous zoom system 100 has a field of view (FOV) that varies from 1.25° to over 38° which makes up the intermediate image 156. The location of the intermediate image 156 does not change with zoom.

Although the design of the mid infrared spectral band continuous zoom system 100 presented here contains the negative and positive moving groups of elements 104 and 106, it should be appreciated that more elements could be moved axially to relay the light 150 from the front positive element 106 to the intermediate image plane 156. The creation of an intermediate image plane 156 also allows for a reticle (not shown) to be used in this location if desired. Basically, the exemplary mid infrared spectral band continuous zoom system 100 has elements 102, 104, 106 and 110 with focal lengths chosen to produce a large zoom range while using as few moving groups 104 and 106 as possible.

If desired, the mid infrared spectral band continuous zoom system 100 may utilize a focus mechanism 124 (e.g., knob and linear actuator) to move the positive element 102 and allow a relatively close object to be in focus for the thermal imaging. In particular, the positive element 102 is fixed for zoom and then can be moved to focus a relatively close object. For instance, the mid infrared spectral band continuous zoom system 100 can have a near focus that is about 1000× the focal length so that the narrow field of view (NFOV) can handle focusing in at about 440 m (1000 times a 440 mm focal length).

In this example, the mid infrared spectral band continuous zoom system 100 incorporates the positive element 102 which has surfaces S1-S2 and is made from zinc selenide (ZNSE). The negative focal length moving group 104 includes a first element 104a and a second element 104b. The first element 104a has surfaces S3-S4 and is made from Ge33As22Se55 glass (AMTIR1). The second element 104b has surfaces S5-S6 and is made from germanium. The positive focal length moving group 106 includes a first element 106a, a second element 106b and a third element 106c. The first element 106a has surfaces S7-S8 and is made from silicon. The second element 106b has surfaces S9-S10 and is made from zinc selenide (ZNSE). The third element 106c has surfaces S11-S12 and is made from germanium. The first fold mirror 108 has surface S13. The intermediate image 156 has surface S14. The relay group 110 includes a first element 110a, a second element 110b, a third element 110c, a fourth element 110d, and a fifth element 110e. The first element 110a has surfaces S15-S16 made from germanium. The second element 110b has surfaces S17-S18 and is made from silicon. The third element 110c has surfaces S19-S20 and is made from germanium. The fourth element 110d has surfaces S21-S22 and is made from zinc sulfide (CLEARTRAN). The fifth element 110e has surfaces S23-S24 and is made from a chalcogenide (IG2). The second fold mirror 112 has surface S25. The cooled infrared camera 114 includes a window 114a, the fixed diameter cold aperture stop 118, and the final image plane 158. The window 114a has surfaces S26-S27 and is made from germanium. The fixed diameter cold aperture stop 118 can be represented as STO. The final image plane 158 can be represented as IMA.

TABLES 1A and 1B present the prescription data (in millimeters) and materials that could be used to manufacture the exemplary mid infrared spectral band continuous zoom system 100. In TABLE 1A, the radius indicates the inverse of the curvature of the surface and the thickness indicates the vertex to vertex distances of the material or airspace.

TABLE 1A

| Surface | Radius | Thickness | Material |
| --- | --- | --- | --- |
| OBJ | Infinity | Infinity | |
| 1 | 138.808 | 12.5 | ZNSE |
| 2 | 349.3339 | VARIABLE_1 | |
| 3 | −80.78687 | 5.896031 | AMTIR1 |
| 4 | 43.55553 | 5.558385 | |
| 5 | 80.12824 | 4 | GERMANIUM |
| 6 | 110.8657 | VARIABLE_2 | |
| 7 | 43.89842 | 4.7 | SILICON |
| 8 | 135.6469 | 0.4287948 | |
| 9 | 56.96466 | 4 | ZNSE |
| 10 | 113.2287 | 0.2623286 | |
| 11 | 74.7812 | 4 | GERMANIUM |
| 12 | 37.10342 | VARIABLE_3 | |
| 13 | Infinity | 31.35303 | |
| 14 | Infinity | 9.110502 | |
| 15 | −22.69671 | 5 | GERMANIUM |
| 16 | −44.56803 | 11.56441 | |
| 17 | 46.5242 | 4.8 | SILICON |
| 18 | −104.4219 | 1.02688 | |
| 19 | −137.1715 | 7.65 | GERMANIUM |
| 20 | 102.9299 | 2.586301 | |
| 21 | 62.84298 | 12 | CLEARTRAN |
| 22 | 45.07646 | 2.909197 | |
| 23 | 55.87358 | 4.6 | IG2 |
| 24 | −51.69404 | 8.999785 | |
| 25 | Infinity | 12.46842 | |
| 26 | Infinity | 1.016 | GERMANIUM |
| 27 | Infinity | 0.75438 | |
| STO | Infinity | 14.33583 | |
| IMA | Infinity | | |

TABLE 1B

| | NFOV | WFOV |
| --- | --- | --- |
| VARIABLE_1 | 106.42 | 21.06 |
| VARIABLE_2 | 1.50 | 132.00 |
| VARIABLE_3 | 53.93 | 8.97 |

The front positive element 102 is a singular element so as to reduce Narcissus and has a diffractive surface S2 to aid with color correction in the 3-5 μm spectral band. At the narrow field of view (NFOV), the front positive element 102 is a pupil element (see FIG. 1A). The use of the diffractive surface S2 in the front positive element 102 reduces the need for the other optical elements 104, 106, 110 to correct chromatic aberrations which would result from not having a color corrected front fixed element 102. In addition, many different optical materials ZNSE, AMTIR1, germanium, silicon, zinc sulfide, and chalcogenide with different amounts of dispersion are used to correct chromatic aberrations (see TABLE 1A). TABLE 2 presents diffractive data (in phase) that can be used to manufacture the front positive element 102.

TABLE 2

| Diffractive Data | | | |
| --- | --- | --- | --- |
| A1 | A2 | A3 | Normalized Radius |
| −466.56 | −92.89 | 187.07 | 100.00 |

The phase of the diffractive surface S2 can be defined by the following equation no. 1:

$$\text{Added Phase} = A1p^2 + A2p^4 + A3p^6 + A4p^8 + A5p^{10} \quad (1)$$

where:
A1, A2, A3, A4 and A5 are coefficients and p is the normalized radial coordinate at the surface S2.

The exemplary mid infrared spectral band continuous zoom system 100 has several aspheres S1, S2, S3, S9, S12, S16, S18 and S22 (non-spherical surfaces S1, S2, S3, S9, S12, S16, S18 and S22) to aid in the correction of monochromatic aberrations. The mid infrared spectral band continuous zoom system 100 has non-spherical surfaces S1, S2, S3, S9, S12, S16, S18 and S22 located therein to balance the aberration correction throughout the entire zoom travel. TABLE 3 presents aspheric data (in sag) that could be used to manufacture the non-spherical surfaces S1, S2, S3, S9, S12, S16, S18 and S22.

TABLE 3

Aspheric Data

| Surface | A | B | C | D |
|---|---|---|---|---|
| 1 | 9.91E−08 | −3.28E−11 | 8.10E−16 | 7.90E−19 |
| 2 | 1.38E−07 | −5.94E−11 | 8.87E−15 | 0.00E+00 |
| 3 | 3.95E−06 | −6.08E−09 | 2.25E−11 | −2.68E−14 |
| 9 | −1.69E−06 | 3.94E−08 | −1.39E−10 | 1.40E−13 |
| 12 | 1.35E−06 | 7.23E−08 | −3.08E−10 | 4.15E−13 |
| 16 | 4.05E−05 | −1.16E−06 | 8.38E−09 | 3.28E−11 |
| 18 | −1.96E−06 | 1.11E−07 | −6.02E−10 | 1.16E−12 |
| 22 | 3.39E−05 | −2.77E−07 | 1.75E−09 | −4.46E−12 |

The non-spherical surfaces S1, S2, S3, S9, S12, S16, S18 and S22 are defined by the following equation no. 2:

$$Z = \frac{(CURV)Y^2}{1 + (1 - (1+K)(CURV)^2 Y^2)^{1/2}} + (A)Y^4 + (B)Y^6 + (C)Y^8 + (D)Y^{10} \quad (2)$$

where:
CURV=1/(Radius of Surface)
Y=Aperture height, measured perpendicular to optical axis
K, A, B, C, D=Coefficients
Z=Position of surface profile for a given Y value, as measured along the optical axis from the pole (i.e. axial vertex) of the surface.

Figure 2A:
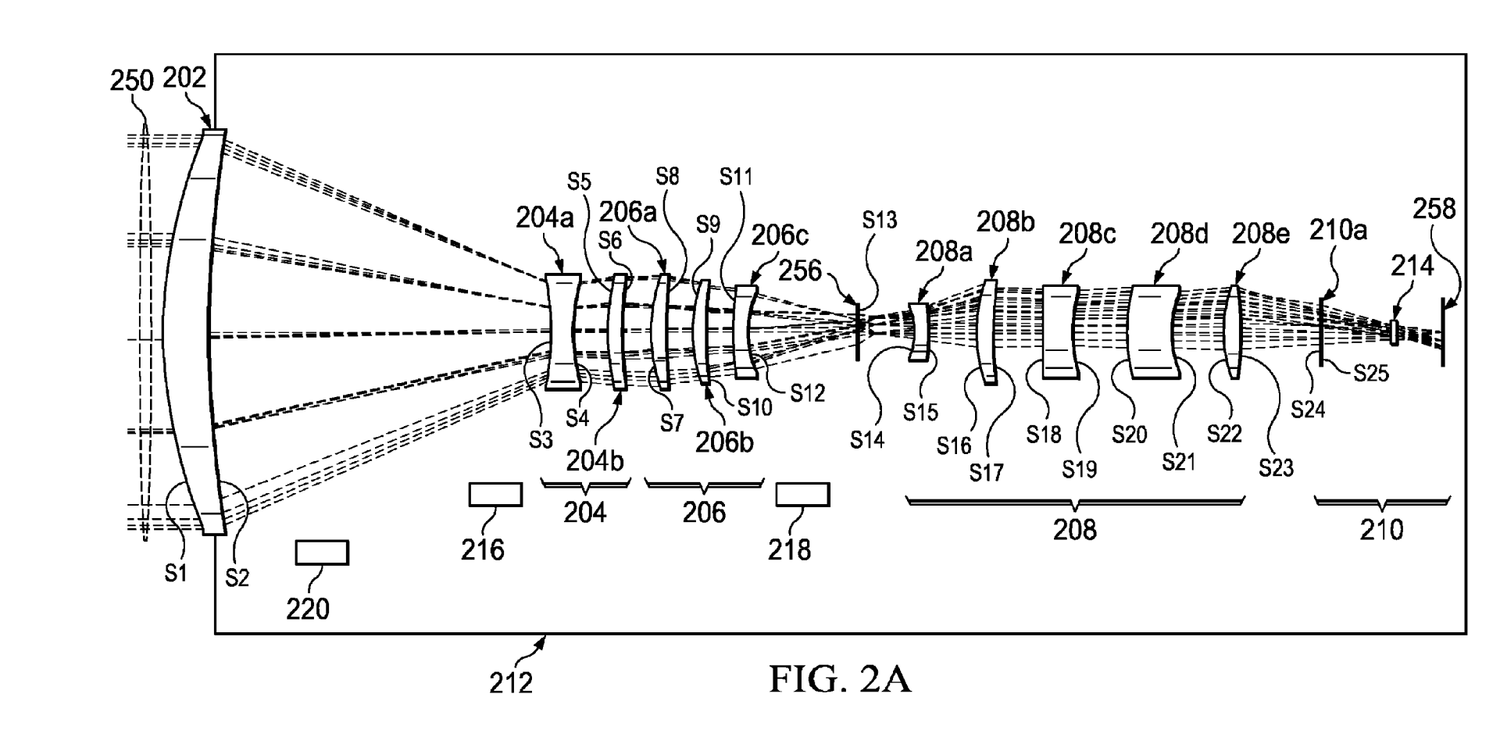
FIGS. 2A-2B illustrate an exemplary mid infrared spectral band continuous zoom system configured in accordance with a second embodiment of the present invention.
Figure 2B:
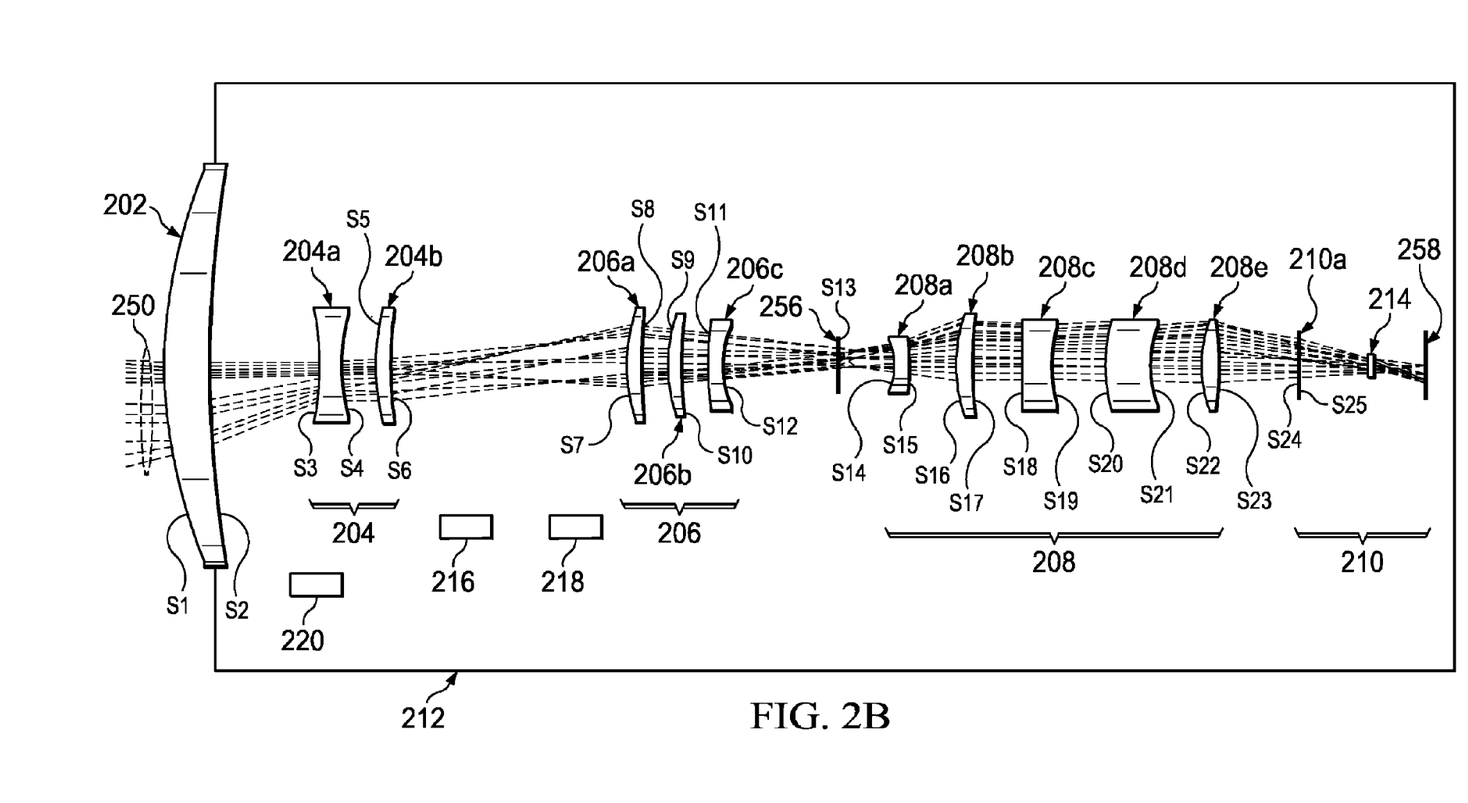

Referring to FIGS. 2A-2B, there are illustrated an exemplary mid infrared spectral band continuous zoom system 200 in accordance with a second embodiment of the present invention. The mid infrared spectral band continuous zoom system 200 includes a positive element 202, a negative focal length moving group 204, a positive focal length moving group 206, a relay group 208, and a cooled infrared camera 210. In addition, the mid infrared spectral band continuous zoom system 200 includes an enclosure 212 (e.g., gimbal enclosure 212, spotting scope enclosure 212) that protects at least the positive element 202, the negative focal length moving group 204, the positive focal length moving group 206, the relay group 208, and the cooled infrared camera 210.

The mid infrared spectral band continuous zoom system 200 has a continuous zoom with a 25× or greater magnification range and a fixed focal plane array that can thermally image an object (not shown) in the 3-5 μm spectral band. In operation, the positive element 202 is positioned to receive and focus incoming light 250 (collimated light 250) from the object. The negative focal length moving group 204 intercepts the light 250 being focused by the positive element 202 and creates a virtual image (which is located to the left of the negative length moving group 204). The positive focal length moving group 206 relays the virtual image to an intermediate image 256 (real image location 256). The relay group 208 relays the intermediate image 256 to a final image plane 258. The relay group 208 also functions to reduce the diameter of the front positive element 202. The cooled infrared camera 210 (with a fixed diameter cold aperture stop 214) thermally images the object at the final image plane 258. The negative focal length moving group 204 and the positive focal length moving group 206 are axially moved relative to one another to provide a continuous zoom range with a focal length change greater than 25×. Linear actuators 216 and 218 can be used to move the negative focal length moving group 204 and the positive focal length moving group 206. The components 202, 204, 206, 208, and 210 can be located in cells.

In this configuration, the size of the intermediate image 256 remains fixed while the field of view (FOV) of the incoming light 250 changes based on the magnifications of the negative focal length moving group 204 and the positive focal length moving group 206. For instance, the negative focal length moving group 204 and the positive focal length moving group 206 can be moved close to one another to enable a narrow field of view (NFOV) of the incoming light 250 to about 1.25° (see FIG. 2A). In contrast, the negative focal length moving group 204 and the positive focal length moving group 206 are moved apart from one another to enable a wide field of view (WFOV) of the incoming light 250 to over 38° (see FIG. 2B). Thus, the mid infrared spectral band continuous zoom system 200 has a field of view (FOV) that varies from 1.25° to over 38° which makes up the intermediate image 256. The location of the intermediate image 256 does not change with zoom.

Although the design of the mid infrared spectral band continuous zoom system 200 presented here contains the negative and positive moving groups of elements 204 and 206, it should be appreciated that more elements could be moved axially to relay the light 250 from the front positive element 206 to the intermediate image plane 256. The creation of an intermediate image plane 256 also allows for a reticle (not shown) to be used in this location if desired. Basically, the exemplary mid infrared spectral band continuous zoom system 200 has elements 202, 204, 206 and 208 with focal lengths chosen to produce a large zoom range while using as few moving groups 204 and 206 as possible.

If desired, the mid infrared spectral band continuous zoom system 200 may utilize a focus mechanism 220 (e.g., knob and linear actuator) to move the positive element 202 and allow a relatively close object to be in focus for the thermal imaging. In particular, the positive element 202 is fixed for zoom and then can be moved to focus a relatively close object. For instance, the mid infrared spectral band continuous zoom system 200 can have a near focus that is about 1000× the focal length so that the narrow field of view (NFOV) can handle focusing in at about 440 m (1000 times a 440 mm focal length).

In this example, the mid infrared spectral band continuous zoom system 200 utilizes the positive element 202 which has surfaces S1-S2 and is made from zinc selenide (ZNSE). The negative focal length moving group 204 includes a first element 204a and a second element 204b. The first element 204a has surfaces S3-S4 and is made from Ge33As22Se55 glass (AMTIR1). The second element 204b has surfaces S5-S6 and is made from germanium. The positive focal length moving group 206 includes a first element 206a, a second element 206b and a third element 206c. The first element 206a has surfaces S7-S8 and is made from silicon. The second element 206b has surfaces S9-S10 and is made from zinc selenide (ZNSE). The third element 206c has surfaces S11-S12 and is made from germanium. The intermediate image 256 has surface S13. The relay group 208 includes a first element 208a, a second element 208b, a third element 208c, a fourth element 208d, and a fifth element 208e. The first element 208a has surfaces S14-S15 made from germanium. The second element 208b has surfaces S16-S17 and is made from silicon. The third element 208c has surfaces S18-S19 and is made from germanium. The fourth element 208d has surfaces S20-S21 and is made from zinc sulfide (CLEARTRAN). The fifth element 208e has surfaces S22-S23 and is made from a chalcogenide (IG2). The cooled infrared camera 210 includes a window 210a, the fixed diameter cold aperture stop 214, and the final image plane 258. The window 210a has surfaces S24-S25 and is made from germanium. The fixed diameter cold aperture stop 214 can be represented as STO. The final image plane 258 can be represented as IMA.

TABLES 4A and 4B present the prescription data (in millimeters) and materials that could be used to manufacture the exemplary mid infrared spectral band continuous zoom system 200. In TABLE 4A, the radius indicates the inverse of the curvature of the surface and the thickness indicates the vertex to vertex distances of the material or airspace.

TABLE 4A

| Surface | Radius | Thickness | Material |
|---|---|---|---|
| OBJ | Infinity | Infinity | |
| 1 | 138.808 | 12.5 | ZNSE |
| 2 | 349.3339 | VARIABLE_1 | |
| 3 | −80.78687 | 5.896031 | AMTIR1 |
| 4 | 43.55553 | 5.558385 | |
| 5 | 80.12824 | 4 | GERMANIUM |
| 6 | 110.8657 | VARIABLE_2 | |
| 7 | 43.89842 | 4.7 | SILICON |
| 8 | 135.6469 | 0.4287948 | |
| 9 | 56.96466 | 4 | ZNSE |
| 10 | 113.2287 | 0.2623286 | |
| 11 | 74.7812 | 4 | GERMANIUM |
| 12 | 37.10342 | VARIABLE_3 | |
| 13 | Infinity | 40.463532 | |
| 14 | −22.69671 | 5 | GERMANIUM |
| 15 | −44.56803 | 11.56441 | |
| 16 | 46.5242 | 4.8 | SILICON |
| 17 | −104.4219 | 1.02688 | |
| 18 | −137.1715 | 7.65 | GERMANIUM |
| 19 | 102.9299 | 2.586301 | |
| 20 | 62.84298 | 12 | CLEARTRAN |
| 21 | 45.07646 | 2.909197 | |
| 22 | 55.87358 | 4.6 | IG2 |
| 23 | −51.69404 | 21.468205 | |
| 24 | Infinity | 1.016 | GERMANIUM |
| 25 | Infinity | 0.75438 | |
| STO | Infinity | 14.33583 | |
| IMA | Infinity | | |

TABLE 4B

| | NFOV | WFOV |
|---|---|---|
| VARIABLE_1 | 106.42 | 21.06 |
| VARIABLE_2 | 1.50 | 132.00 |
| VARIABLE_3 | 53.93 | 8.97 |

The front positive element 202 is a singular element so as to reduce Narcissus and has a diffractive surface S2 to aid with color correction in the 3-5 μm spectral band. At the narrow field of view (NFOV), the front positive element 202 is a pupil element (see FIG. 2A). The use of the diffractive surface S2 in the front positive element 202 reduces the need for the other optical elements 204, 206 and 208 to correct chromatic aberrations which would result from not having a color corrected front fixed element 202. In addition, many different optical materials ZNSE, AMTIR1, germanium, silicon, zinc sulfide, and a chalcogenide with different amounts of dispersion are used to correct chromatic aberrations (see TABLE 4A). TABLE 5 presents diffractive data (in phase) that can be used to manufacture the front positive element 202.

TABLE 5

| Diffractive Data | | | |
|---|---|---|---|
| A1 | A2 | A3 | Normalized Radius |
| −466.56 | −92.89 | 187.07 | 100.00 |

The phase of the diffractive surface S2 can be defined by the following equation no. 3:

$$\text{Added Phase} = A1p2 + A2p4 + A3p6 + A4p8 + A5p10 \tag{3}$$

where:
A1, A2, A3, A4 and A5 are coefficients and p is the normalized radial coordinate at the surface S2.

The exemplary mid infrared spectral band continuous zoom system 200 has several aspheres S1, S2, S3, S9, S12, S15, S17 and S21 (non-spherical surfaces S1, S2, S3, S9, S12, S15, S17 and S21) to aid in correction of monochromatic aberrations. The mid infrared spectral band continuous zoom system 200 has non-spherical surfaces S1, S2, S3, S9, S12, S15, S17 and S21 located therein to balance the aberration correction throughout the entire zoom travel. TABLE 6 presents aspheric data (in sag) that could be used to manufacture the non-spherical surfaces S1, S2, S3, S9, S12, S15, S17 and S21.

TABLE 6

| Aspheric Data | | | | |
|---|---|---|---|---|
| Surface | A | B | C | D |
| 1 | 9.91E−08 | −3.28E−11 | 8.10E−16 | 7.90E−19 |
| 2 | 1.38E−07 | −5.94E−11 | 8.87E−15 | 0.00E+00 |
| 3 | 3.95E−06 | −6.08E−09 | 2.25E−11 | −2.68E−14 |
| 9 | −1.69E−06 | 3.94E−08 | −1.39E−10 | 1.40E−13 |
| 12 | 1.35E−06 | 7.23E−08 | −3.08E−10 | 4.15E−13 |
| 15 | 4.05E−05 | −1.16E−06 | 8.38E−09 | 3.28E−11 |
| 17 | −1.96E−06 | 1.11E−07 | −6.02E−10 | 1.16E−12 |
| 21 | 3.39E−05 | −2.77E−07 | 1.75E−09 | −4.46E−12 |

The non-spherical surfaces S1, S2, S3, S9, S12, S15, S17 and S21 are defined by the following equation no. 4:

$$Z = \frac{(CURV)Y^2}{1 + (1-(1+K)(CURV)^2 Y^2)^{1/2}} + (A)Y^4 + (B)Y^6 + (C)Y^8 + (D)Y^{10} \tag{2}$$

where:
CURV=1/(Radius of Surface)
Y=Aperture height, measured perpendicular to optical axis
K, A, B, C, D=Coefficients
Z=Position of surface profile for a given Y value, as measured along the optical axis from the pole (i.e. axial vertex) of the surface.

Although two embodiments of the present invention have been illustrated in the accompanying Drawings and described in the foregoing Detailed Description, it should be understood that the invention is not limited to the two disclosed embodiments, but is capable of numerous rearrangements, modifications and substitutions without departing from the invention as set forth and defined by the following claims. It should also be noted that the reference to the "present invention" or "invention" used herein relates to exemplary embodiments and not necessarily to every embodiment that is encompassed by the appended claims.

The invention claimed is:

1. A mid infrared spectral band continuous zoom system for thermally imaging an object, comprising:
   a positive element that focuses incoming light from the object;
   a negative focal length group which moves for zooming, and that intercepts the light being focused by the positive element and creates a virtual image;
   a positive focal length group which moves for zooming, and that relays the virtual image created by the negative focal length group to an intermediate image;
   a relay group which is fixed during zooming, and that relays the intermediate image to a final image plane; and
   a cooled infrared camera that thermally images the object at the final image plane, where the negative focal length group and the positive focal length groups are moved relative to one another while providing a continuous zoom range with a focal length change greater than 25×.

2. The mid infrared spectral band continuous zoom system of claim 1, wherein the cooled infrared camera is configured to image the object over 3-5 μm spectral band.

3. The mid infrared spectral band continuous zoom system of claim 1, wherein the negative focal length group and the positive focal length group are configurable to enable a near focus of about 1000× the focal length.

4. The mid infrared spectral band continuous zoom system of claim 1, wherein the positive element contains a diffractive surface for correcting chromatic aberration.

5. The mid infrared spectral band continuous zoom system of claim 1, wherein the positive element is a singular element for reducing Narcissus.

6. The mid infrared spectral band continuous zoom system of claim 1, wherein the positive element is moved for focusing the object.

7. The mid infrared spectral band continuous zoom system of claim 1, further comprising:
   a first fold mirror located between the positive focal length group and the relay group; and
   a second fold mirror located between the relay group and the cooled infrared camera.

8. The mid infrared spectral band continuous zoom system of claim 1, wherein the negative focal length group and the positive focal length group are moved close to one another to enable a narrow field of view of the incoming light to about 1.25°.

9. The mid infrared spectral band of claim 1, wherein the negative focal length group and the positive focal length group are moved apart from one another to enable a wide field of view of the incoming light to about 38°.

10. The mid infrared spectral band of claim 1, wherein the cooled infrared camera includes a fixed diameter cold stop.

11. The mid infrared spectral band continuous zoom system of claim 1, wherein:
   the positive element is made from zinc selenide;
   the negative focal length group includes a first element made from $Ge_{33}As_{22}Se_{55}$ glass, and a second element made from germanium;
   the positive focal length group includes a first element made from silicon, a second element made from zinc selenide, and a third element made from germanium; and
   the relay group includes a first element made from germanium, a second element made from silicon, a third element made from germanium, a fourth element made from zinc sulfide, and a fifth element made from chalcogenide.

12. The mid infrared spectral band continuous zoom system of claim 1, wherein:
   the positive element has two aspheric surfaces;
   the negative focal length group includes a first element with an aspheric surface and a spherical surface, and a second element with two spherical surfaces;
   the positive focal length group includes a first element with an aspheric surface and a spherical surface, a second element with two spherical surfaces, and a third element with a spherical surface and an aspheric surface; and
   the relay group includes a first element with a spherical surface and an aspheric surface, a second element with a spherical surface and an aspheric surface, a third element with two spherical surfaces, a fourth element with a spherical surface and an aspheric surface, and a fifth element with two spherical surfaces.

13. The mid infrared spectral band continuous zoom system of claim 1, further comprising a gimbal device that encloses the positive element, the negative focal length group, the positive focal length group, the relay group, and the cooled infrared camera.

14. A method for thermally imaging an object, the method comprising the steps of:
   providing a mid infrared spectral band continuous zoom system including:
      a positive element that focuses incoming light from the object;
      a negative focal length group which moves for zooming, and that intercepts the light being focused by the positive element and creates a virtual image;
      a positive focal length group which moves for zooming, and that relays the virtual image created by the negative focal length moving group to an intermediate image;
      a relay group which is fixed during zooming, and that relays the intermediate image to a final image plane; and
      a cooled infrared camera that thermally images the object at the final image plane; and
   moving the negative focal length group and the positive focal length group relative to one another while providing a continuous zoom range with a focal length change greater than 25× when imaging the object.

15. The method of claim 14, wherein a cooled infrared camera is configured to thermally image the object over a 3-5 μm spectral band.

16. The method of claim 14, wherein the negative focal length group and the positive focal length group are configurable to enable a near focus of about 1000× the focal length.

17. The method of claim 14, wherein the positive element contains a diffractive surface for correcting chromatic aberration.

18. The method of claim 14, wherein the positive element is a singular element for reducing Narcissus.

19. The mid infrared spectral band continuous zoom system of claim 14, wherein the positive element is moved for focusing the object.

20. The method of claim 14, further comprising the step of moving the negative focal length group and the positive focal length group close to one another to enable a narrow field of view of the incoming light to about 1.25°.

21. The method of claim 14, further comprising the step of moving the negative focal length group and the positive focal length group apart from one another to enable a wide field of view of the incoming light to about 38°.

22. The method of claim 14, wherein:
the positive element is made from zinc selenide;
the negative focal length group includes a first element made from $Ge_{33}As_{22}Se_{55}$ glass, and a second element made from germanium;
the positive focal length group includes a first element made from silicon, a second element made from zinc selenide, and a third element made from germanium; and
the relay group includes a first element made from germanium, a second element made from silicon, a third element made from germanium, a fourth element made from zinc sulfide, and a fifth element made from chalcogenide.

23. The method of claim 14, wherein:
the positive element has two aspheric surfaces;
the negative focal length group includes a first element with an aspheric surface and a spherical surface, and a second element with two spherical surfaces;
the positive focal length group includes a first element with an aspheric surface and a spherical surface, a second element with two spherical surfaces, and a third element with a spherical surface and an aspheric surface; and
the relay group includes a first element with a spherical surface and an aspheric surface, a second element with a spherical surface and an aspheric surface, a third element with two spherical surfaces, a fourth element with a spherical surface and an aspheric surface, and a fifth element with two spherical surfaces.

* * * * *